United States Patent
Wang (10) Patent No.: US 11,675,649 B2
(45) Date of Patent: Jun. 13, 2023

(54) FAULT PREDICTION METHOD, APPARATUS AND STORAGE MEDIUM

(71) Applicant: BEIJING BAIDU NETCOM SCIENCE AND TECHNOLOGY CO., LTD., Beijing (CN)

(72) Inventor: Xiaolong Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 71 days.

(21) Appl. No.: 17/302,731

(22) Filed: May 11, 2021

(65) Prior Publication Data
US 2021/0311813 A1    Oct. 7, 2021

(30) Foreign Application Priority Data
Jul. 20, 2020    (CN) .......................... 202010700415.5

(51) Int. Cl.
G06F 11/00    (2006.01)
G06F 11/07    (2006.01)

(52) U.S. Cl.
CPC ........ *G06F 11/079* (2013.01); *G06F 11/0709* (2013.01); *G06F 11/0751* (2013.01); *G06F 11/0772* (2013.01)

(58) Field of Classification Search
CPC . G06F 11/079; G06F 11/0709; G06F 11/0751
See application file for complete search history.

(56) References Cited

U.S. PATENT DOCUMENTS

2016/0364286 A1* 12/2016 Charters ............. G06F 11/0793

FOREIGN PATENT DOCUMENTS

CN    106899436 A    6/2017
CN    110096039 A    8/2019
(Continued)

OTHER PUBLICATIONS

Bambharolia P., et al., "Failure Prediction and Detection in Cloud Datacenters," International Journal of Scientific & Technology Research, vol. 6, Issue 09, Sep. 9, 2017, XP055898960, Retrieved from the Internet :URL: https://www.ijstr.org/final-print/sep2017/Failure-Prediction-And-Detection-In-Cloud-Datacenters.pdf, pp. 122-127.

(Continued)

*Primary Examiner* — Philip Guyton
(74) *Attorney, Agent, or Firm* — Patterson Thuente, P.A.

(57) ABSTRACT

The present application discloses a fault prediction method, apparatus, and a storage medium, and relates to fields of cloud computing and fault processing. An embodiment includes acquiring a fault alarm request, wherein the fault alarm request is obtained by at least two fault triggering parameters of a fault generated by cloud operation, a hidden danger generated by cloud operation, and a change generated by terminal operation at a user level; analyzing the fault alarm request, to obtain at least two fault triggering parameters of the fault, the hidden danger, and the change; establishing an association between the at least two fault triggering parameters of the fault, the hidden danger, and the change, to obtain an association result; and predicting a fault causing the fault alarm request according to the association result, to obtain a fault prediction result.

18 Claims, 4 Drawing Sheets

(56) References Cited

FOREIGN PATENT DOCUMENTS

| | | |
|---|---|---|
| JP | 2008015596 A | 1/2008 |
| JP | 2008234351 A | 10/2008 |
| JP | 2009064101 A | 3/2009 |
| JP | 2017016382 A | 1/2017 |
| JP | 2019053474 A | 4/2019 |
| WO | 2013136739 A1 | 9/2013 |

OTHER PUBLICATIONS

Extended European Search Report for Application No. 21172816.7, dated Mar. 16, 2022, 9 pages.

* cited by examiner

FAULT PREDICTION METHOD, APPARATUS AND STORAGE MEDIUM

CROSS-REFERENCE TO RELATED APPLICATION

This application claims priority to Chinese patent application No. 202010700415.5, filed on Jul. 20, 2020, which is hereby incorporated by reference in its entirety.

TECHNICAL FIELD

The present application relates to the field of data processing, and particularly to the fields of cloud computing and fault processing, embodiments may be applied to the fields of fault prediction, fault location, fault repair and the like, related to faults.

BACKGROUND

With the development of Internet technology, communication technology and terminal intellectualization, daily big data processing based on data interaction presents the trend of blowout for enterprise users or individual users. Therefore, a large amount of big data analysis and data operation and maintenance are needed.

SUMMARY

The present application provides a fault prediction method and apparatus, electronic device and a storage medium.

According to one aspect of the present application, there is provided a fault prediction method, including:

acquiring a fault alarm request, wherein the fault alarm request is obtained by at least two fault triggering parameters of a fault generated by cloud operation, a hidden danger generated by cloud operation, and a change generated by terminal operation at a user level;

analyzing the fault alarm request to obtain at least two fault triggering parameters of the fault, the hidden danger and the change;

establishing an association between the at least two fault triggering parameters of the fault, the hidden danger and the change to obtain an association result; and predicting a fault causing the fault alarm request according to the association result to obtain a fault prediction result.

According to another aspect of the present application, there is provided a fault prediction apparatus, including:

a request acquisition module configured to acquire a fault alarm request, wherein the fault alarm request is obtained by at least two fault triggering parameters of a fault generated by cloud operation, a hidden danger generated by cloud operation, and a change generated by terminal operation at a user level;

a request analysis module configured to analyze the fault alarm request to obtain the at least two fault triggering parameters of the fault, the hidden danger and the change;

an association module configured to establish an association between the at least two fault triggering parameters of the fault, the hidden danger and the change to obtain an association result; and a prediction module configured to predict the fault causing the fault alarm request according to the association result to obtain a fault prediction result.

According to a third aspect, there is provided electronic device, including at least one processor, and a memory communicatively connected with the at least one processor; wherein, the memory stores instructions executable by the at least one processor, the instructions being executed by the at least one processor to enable the at least one processor to perform the method according to any embodiment of the present application.

According to another aspect, a non-transitory computer-readable storage medium storing computer instructions is provided for enabling the computer to perform the method according to any embodiment of the present application.

It should be understood that the content in this section is not intended to identify key or critical features of the embodiments of the present application, nor is it intended to limit the scope of the present application. Other features of the present application will become readily apparent from the following description.

BRIEF DESCRIPTION OF THE DRAWINGS

The drawings are included to provide a better understanding of the solution and are not to be construed as limiting the present application. In the drawings.

DETAILED DESCRIPTION

The following describes exemplary embodiments of the present application with reference to the accompanying drawings, which include various details of the embodiments of the present application to facilitate understanding, and should be considered as merely examples. Accordingly, one of ordinary skill in the art appreciates that various changes and modifications can be made to the embodiments described herein without departing from the scope and spirit of the present application. Also, descriptions of well-known functions and structures are omitted from the following description for clarity and conciseness.

The term "and/or" herein is merely an association relationship that describes an associated object, meaning that there may be three relationships, e.g., A and/or B, that may represent that there are three cases of A alone, A and B present together, and B alone. As used herein, the term "at least one" means any combination of any one or at least two of a plurality of ones, e.g., including at least one of A, B, C, may mean to include any one or more elements selected from the group consisting of A, B, and C. The terms "first" and "second" are used herein to refer to and distinguish between a plurality of similar terms, and are not intended to be limiting in order, or to define only two terms, e.g., a first feature and a second feature refer to two categories/features, the first feature may be one or more, and the second feature may be one or more.

Furthermore, in the following detailed description, numerous specific details are set forth in order to provide a better understanding of the present application. It will be understood by those skilled in the art that the present application may be practiced without some of the specific details. In some instances, methods, means, elements, and circuits well known to those skilled in the art have not been described in detail so as not to obscure the subject matter of the present application.

Taking a cloud computing service for the big data analysis and data operation and maintenance as an example, the cloud computing service may be an addition, a use and a delivery mode for related services depending on the Internet. At present, cloud computing services have become a cornerstone of IT construction for enterprise users, and it is very important to provide stable and reliable operation environment for the enterprise users. The stability of the cloud computing service environment largely depends on high-quality operation and maintenance work. If a fault occurs in the operation and maintenance work, the operation environment of the cloud computing service is unstable. For this, no effective solution is provided in the related art.

The meanings of the following technical terms appearing in the present application are explained.

1. Plan, which refers to a pre-established processing scheme for a certain fault, and can be executed manually or automatically.

2. Standard Operating Procedure (SOP), which refers to a standardized operating manual developed for a specific scenario.

3. Problem follow-up rate, which refers to a division operation of the solved and unsolved problems with a definite follow-up person and described for the follow-up current situation by the total number of problems; if the "the solved and unsolved problems with the definite follow-up person and described for the follow-up current situation" is recorded as A1, the "total number of problems" is recorded as B1, and the "problem follow-up rate" is recorded as C1, then C1=A1/B1.

4. Problem solving rate, which refers to a division operation of the number of solved faults with a definite follow-up person and root causes by the total number of problems; if "the number of solved faults with the definite follow-up person and root causes" is recorded as A2, "the total number of problems" is recorded as B1, and "the problem solving rate" is recorded as C2, then C2=A2/B1.

5. Fault weight, which refers to the possibility, or probability, of fault caused by the change or hidden danger (or, "risk"), the value of the fault weight ranging from 0 to 1. "0" means no fault will occur and "1" means that a fault must occur.

6. Hidden danger level, which classifies a problem in two dimensions, the priority P and the severity S of the problem.

7. Problem priority, which can include:

P1: highest priority, required to be resolved or at least providing a temporary stop-loss plan within two weeks.

P2: high priority, required to be resolved or at least providing a temporary stop-loss plan within one month.

P3: medium priority, required to be resolved within 1 quarter.

P4: low priority, required to be resolved within 2 quarters.

8. Problem severity, which can include:

S1: maximum severity, meaning that user business has been damaged, or is about to be damaged.

S2: high severity, meaning that user business has not been affected, but has a high probability of being damaged.

S3: medium severity, meaning that hidden danger is present, and might affect user business.

S4: low severity, generally referring to an actively initiated work to improve stability.

In the related art, the operation and maintenance work is performed for an operating environment of a cloud computing service, and the targeted solution is mainly carried out for faults, hidden dangers and changes. The faults can be sensed by a monitoring system in the cloud computing service, and then a responsive plan is provided for manual, semi-automatic or automatic fault prediction and the like. Most of the hidden dangers are passively sensed, and special processing of the contents of the hidden dangers can be carried out according to the contents of the hidden dangers. The changes may be manipulated manually, or by changing a platform, and checked according to a predetermined checklist.

Since separate solutions are provided for the above faults, hidden dangers, and changes, the following problems exist.

1. The fault treatment is performed for the purpose of timely loss stopping. For parts of faults of which loss stopping solutions are clear while root causes are difficult to find, generally, timely loss stopping is selected, while no effective subsequent trace for root causes will be carried out. The method has not found root causes, and it is difficult to converge and eliminate the fault.

2. The hidden danger is treated by paying attention to only hidden danger eradication, the time consumption is generally long, and the hidden danger is often lost or missed when manpower and time are constrained.

3. The processing of the change is generally caused at the level of a terminal user, such as an alteration of a user program, and it is difficult for the operation and maintenance personnel to accurately evaluate the quality thereof. It is more difficult to find, locate and trace a hidden danger and fault caused by the change caused especially by indirect reasons such as a non-user program.

4. The operation and maintenance personnel are generally responsible for the processing of faults, hidden dangers and changes, and may be different people, so that the communication cost among a plurality of operation and maintenance personnel is generated. It is resources can be exhausted simply to solve to the current problem, but the underlying fault may not be effectively converged and eliminated, and the future possibility of fault development cannot be accurately predicted in time.

In an example of the present application, taking the application scenario of a cloud computing service as an example, linkage processing for establishing association of the fault, the hidden danger and the change of the cloud computing environment with each other can be performed, and closed-loop convergence after the faults, the hidden dangers and the changes are associated can be realized by means of standardized data input and automatic intelligent management and prediction, that is, one ring is linked with another.

For example, a fault may not be caused by itself. For example, a fault may be caused by a hidden danger not solved, or a fault may be caused by a change at the user level of the terminal side, but not the abnormal running environment of cloud computing on the background side and the like. Furthermore, by performing standardized definition, data construction and the like on input, processing, analysis, follow-up and the like of the fault, the hidden danger, and the change, and an automatic management platform which receives data input to perform data (such as the fault, the hidden danger, the change and the like) association analysis and prediction may weight association and horizontal communication on the fault, the hidden danger and the change according to their respective weights so as to jointly locate the root cause of the fault and achieve the purpose of automatic convergence and the automatic prediction of the fault, the hidden danger and the change. Finally, based on the data association analysis, suggestions and predictions are given for the overall stability operation and maintenance of the cloud computing environment. Therefore, the fault can be quickly eliminated, the hidden danger, the change and even other reasons possibly causing the fault can be eliminated, the quality of operation and maintenance control work can be actively controlled, and the running environment of the cloud computing service can be guaranteed to be in a stable state.

Figure 1:
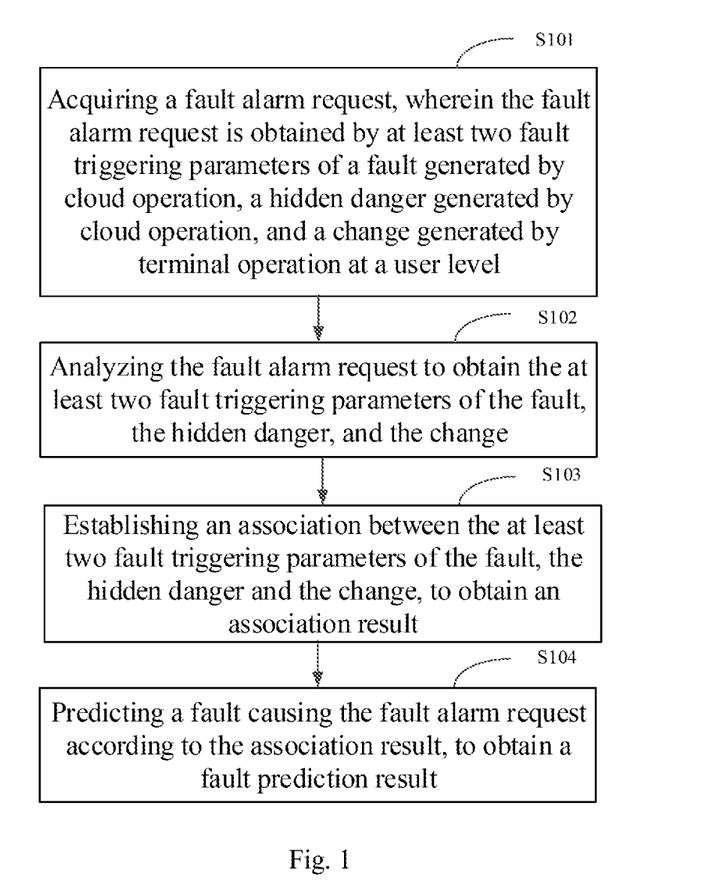
FIG. 1 is a flowchart of a fault prediction method according to an embodiment of the present application.

According to an embodiment of the present application, there is provided a fault prediction method. FIG. 1 is a flowchart of a fault prediction method according to an embodiment of the present application. The method can be applied to a fault prediction apparatus. For example, the apparatus can be deployed to be executed by a terminal or a server or another processing device, and it can execute fault alarming, fault analysis, fault prediction, early warning, or the like. Among other things, the terminal may be a user device (UE), a mobile apparatus, a cellular phone, a cordless phone, a personal digital assistant (PDA), a handheld apparatus, a computing apparatus, a vehicle-mounted apparatus, a wearable apparatus, etc. In some possible implementations, the method may be implemented by a processor calling computer-readable instructions stored in a memory. As shown in FIG. 1, the method comprises the following operations.

In S101, a fault alarm request is acquired. The fault alarm request is obtained by at least two of fault triggering parameters of a fault and a hidden danger generated by cloud operation and a change generated by terminal operation at a user level.

In an example, a fault alarm request may be caused by the fault itself; the fault alarm request may be caused by be a fault caused by hidden danger; the fault alarm request may be caused by a fault caused by the change generated by the operation of the terminal at the user level; or the fault alarm request may be caused by a hidden danger caused by a fault that cannot be eliminated timely, the hidden danger further aggravating the various possibilities caused by the fault, as long as the fault alarm request is obtained by at least two of the fault triggering parameters, i.e., the fault, the hidden danger and the change, all within the scope of protection of the present application.

In S102, the fault alarm request is analyzed to obtain at least two fault triggering parameters of the fault, the hidden danger and the change.

In an example, by analyzing the fault alarm request, various triggering parameters causing the fault may be obtained. For example, the fault alarm request is analyzed to discover whether the fault itself causes the fault, or the fault is caused by the hidden danger, or the fault is caused by the change generated by terminal operation at a user level, etc.

In S103, an association between at least two of the fault triggering parameters of the fault, the hidden danger and the change is established to obtain an association result.

In an example, the association result may be obtained by performing a weighted association between the fault, the hidden danger, and the change based on their respective weights.

In another example, if a historical prediction result exists and the fault can be resolved, then after the fault is resolved and the loss is stopped in time, the fault is associated with the hidden danger and the change (which may be a weighted association based on various weights) to obtain the association result.

In S104, a fault causing the fault alarm request is predicted according to the association result, to obtain a fault prediction result.

With the present application, a fault alarm request may be acquired, the fault alarm request is obtained by at least two fault triggering parameters of a fault generated by cloud operation, a hidden danger generated by cloud operation and a change generated by terminal operation at a user level; the fault alarm request is analyzed to obtain the at least two fault triggering parameters of the fault, the hidden danger and the change; an association between the at least two fault triggering parameters of the fault, the hidden danger and the change is established to obtain an association result; and a fault causing the fault alarm request is predicted according to the association result to obtain a fault prediction result. Due to the fact that the association is established based on the fault itself triggering the fault alarm request and at least two fault triggering parameters related to the fault, such as the hidden danger and the change, and the fault causing the fault alarm request is predicted according to the association result obtained by establishing the association, the fault prediction accuracy can be improved.

In an example, if the fault alarm request is caused by a hidden danger caused by a fault itself that cannot be eliminated in time, and the hidden danger further aggravates a new fault problem caused by the fault, the fault causing the fault alarm request is predicted according to the association result obtained by associating the fault with the hidden danger so as to obtain the fault prediction result of the fault caused by "the fault itself and the hidden danger caused by the fault itself".

In another example, in addition to predicting a fault that causes the fault alarm request based on the association result in the above example, the fault prediction result may be compared with a historical prediction value and corrected based on the historical prediction value so as to connect the corrected prediction result to at least one required application (e.g. to interface one or more applications of enterprise internal communication security application scenarios required by enterprise users); alternatively, the fault prediction result may be compared with actual operational data of the operating environment of the cloud computing service and corrected based on the actual operational data so as to interface the corrected prediction results to at least one desired application (e.g., to interface to one or more applications of the enterprise internal communication security application scenarios required by the enterprise users).

In an embodiment, a fault alarm request may be acquired, the fault alarm request is obtained by at least two fault triggering parameters of a fault generated by cloud operation, a hidden danger generated by cloud operation and a change generated by terminal operation at a user level; the fault alarm request is analyzed to obtain the at least two fault triggering parameters of the fault, the hidden danger and the change; an association between the at least two fault triggering parameters of the fault, the hidden danger and the change is established to obtain an association result; and a fault causing the fault alarm request is predicted according to the association result to obtain a fault prediction result. Due to the fact that the association is established based on the fault itself triggering the fault alarm request and at least two fault triggering parameters related to the fault, such as the hidden danger and the change, and the fault causing the fault alarm request is predicted according to the association result obtained by establishing the association, the fault prediction accuracy can be improved.

In an embodiment, the operation of establishing the association between at least two fault triggering parameters of the fault, the hidden danger and the change to obtain an association result includes performing a weighted correlation for respective weights of the fault, the hidden danger and the change according to a multi-to-multi relationship (for example, respectively adopting weight default values obtained according to design requirements or historical prediction values) to obtain the association result.

With embodiments of the present disclosure, the purpose of horizontally associating the fault, the hidden danger and the change is achieved by the weighted association, so that the fault, the hidden danger and the change are horizontally communicated, and the root source of the fault (such as the fault itself, the fault caused by the hidden danger, the fault caused by the change and the like) can be positioned more quickly, thereby accelerating the locating of the problem of the fault and solving the fault in time (alternatively, if the fault is determined to be caused by a hidden danger, the hidden danger is eliminated, and the elimination of the hidden danger solves the problem of the fault; or if the fault is determined to be caused by a change, it prompts to the terminal that a fault has occurred, so that the terminal can timely adjust the change operation of the terminal at the user level and the like), and stop loss in time.

In an embodiment, the method further comprises: performing a weight adjustment on the respective weights according to the processing information, and then performing the weighted association to obtain the association result. The processing information is configured to represent related information generated after analyzing and/or processing the fault, the hidden danger and the change.

In an embodiment, the operation of establishing the association between at least two fault triggering parameters of the fault, the hidden danger and the change to obtain the association result comprises: after predicting the fault according to the historical prediction value, synchronously associating the fault with the hidden danger and the change, to obtain the association result.

With the embodiment, if a historical prediction result (such as a recommended plan obtained according to the historical prediction and the like) already exists, the fault can be solved in advance. After solving the fault and stopping loss in time, the fault can be associated with the hidden danger and the change (which can be a weighted association of the respective weights of the fault, the hidden danger and the change), so as to obtain the association result. That is, after the fault alarm, the historical recommendation plan associated with the fault can be automatically recommended and executed, and the fault can also be automatically associated with the hidden danger and the change.

Since the historical recommendation plan is directed to predicting the fault, it can now predict the fault to locate the fault and eliminate it in time. Later, further, the fault, the hidden danger and the change are associated with each other, so that based on the association, horizontally associating of the fault, the hidden danger and the change is achieved by the weighted association, the fault, the hidden danger and the change are horizontally communicated, and the root source of the fault (such as the fault itself, the fault caused by the hidden danger, the fault caused by the change and the like) can be positioned more quickly, thereby accelerating the locating of the problem of the fault and solving the fault in time (alternatively, if the fault is determined to be caused by the hidden danger, the hidden danger is eliminated, and the elimination of a hidden danger solves the problem of the fault; or if the fault is determined to be caused by a change, it prompts to the terminal that the fault has occurred, so that the terminal can timely adjust the change operation of the terminal at the user level and the like), and stop the loss in time.

Figure 2:
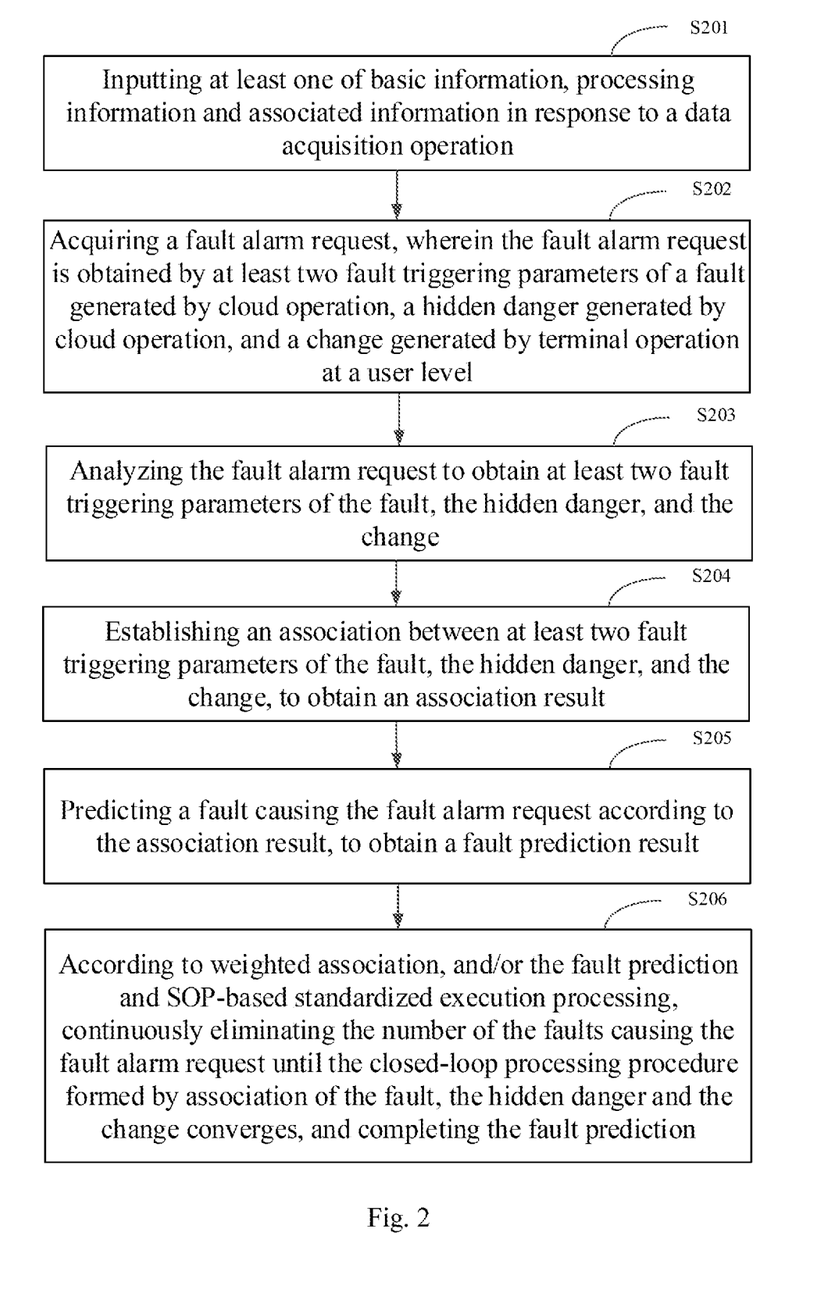
FIG. 2 is a flowchart of a fault prediction method according to an embodiment of the present application.

According to the embodiment of the invention, a fault prediction method is provided. FIG. 2 is a flowchart of a fault prediction method according to an embodiment of the present application. As shown in FIG. 2, the method includes the following operations.

In S201, at least one of basic information, processing information, or associated information is input in response to a data acquisition operation.

In an example, the basic information is configured to represent various self-related information of the fault, the hidden danger and the change. The processing information is configured to represent related information generated after analyzing and/or processing the fault, the hidden danger and the change. The associated information is configured to represent information relating to upstream and downstream of the fault corresponding to the fault.

In S202, a fault alarm request is acquired. The fault alarm request is obtained by at least two fault triggering parameters of a fault generated by cloud operation, a hidden danger generated by cloud operation, and a change generated by terminal operation at a user level.

In an example, a fault alarm request may be caused by the fault itself; or, the fault alarm request may be caused by a hidden danger; or, the fault alarm request may be caused by a change generated by terminal operation at a user level; or, the fault alarm request may be caused by a hidden danger caused by a fault itself which cannot be eliminated timely, the hidden danger further aggravates various possibilities caused by the fault; as long as the fault alarm request is obtained by at least two fault triggering parameters of the fault, the hidden danger and the change, it is within the scope of protection of the present application.

In S203, the fault alarm request is analyzed to obtain at least two fault triggering parameters of the fault, the hidden danger and the change.

In an example, by analyzing the fault alarm request, various triggering parameters causing the fault may be obtained. For example, the fault alarm request is analyzed to discover whether the fault itself causes the fault, or the fault is caused by a hidden danger, or the fault is caused by a change generated by terminal operation at a user level, etc.

In S204, an association between at least two fault triggering parameters of the fault, the hidden danger and the change is established to obtain an association result.

In an example, the association result may be obtained by performing a weighted association for respective weights of the fault, the hidden danger, and the change.

In another example, if a historical prediction result exists and the fault can be resolved, then after the fault is resolved and the loss is stopped in time, the fault is associated with the hidden danger and the change (which may be a weighted association of various weights) to obtain the association result.

In S205, the fault causing the fault alarm request is predicted according to the association result, to obtain a fault prediction result.

In S206, the fault causing the fault alarm request is eliminated continuously according to the weighted association, and/or the fault prediction and SOP-based standardized execution processing, until the closed-loop processing procedure formed by the association of the fault, the hidden danger and the change converge, and the fault prediction is completed.

In an example, the SOP is a standardized operating manual developed for a particular scenario, and various processes such as the data collection operation, the association, and fault prediction described above may be performed automatically in accordance with the SOP without excessive human intervention.

With the present application, a fault alarm request may be acquired, the fault alarm request is obtained by at least two fault triggering parameters of a fault generated by cloud operation, a hidden danger generated by cloud operation, and a change generated by terminal operation at a user level; the fault alarm request may be analyzed to obtain at least two fault triggering parameters of the fault, the hidden danger and the change; an association between at least two fault triggering parameters of the fault, the hidden danger and the change may be established to obtain an association result; and the fault causing the fault alarm request may be predicted according to the association result, to obtain a fault prediction result. According to the weighted association, and/or the fault prediction and SOP-based standardized execution processing, the fault causing the fault alarm request is eliminated continuously until the closed-loop processing procedure formed by the association of the fault, the hidden danger and the change converges, and the fault prediction is completed. Due to the fact that the association is established based on the fault itself triggering the fault alarm request and at least two fault triggering parameters related to the fault, such as the hidden danger and the change, and the fault causing the fault alarm request is predicted according to the association result obtained by establishing the association, the fault prediction accuracy can be improved. In addition, with the continuous operation of the closed-loop processing procedure of the whole fault prediction, the number of faults is continuously converged and less by the automatic association, the automatic fault prediction plan and execution of the SOP. The whole closed-loop processing procedure does not need too much human intervention and is executed automatically, so that the fault prediction is accurate, the stability is improved, and the labor cost can be reduced.

In an embodiment, at least one of basic information, processing information, or associated information may be input in response to a data collection operation. Also, at least one of basic information, processing information, or associated information can be input continuously in response to the operation of obtaining the association result based on association of the fault, the hidden danger and the change. The whole response process is also a closed-loop processing procedure, so that the integrity and accuracy of the input data can be guaranteed, the accuracy of the final fault prediction result obtained based on the input data is high, and the stability of the running environment of the cloud computing service is improved.

Alternatively, after at least one of basic information, processing information, or associated information is input continuously in response to the operation of obtaining the association result based on association of the fault, the hidden danger and the change, the continuous association after the fault alarm is caused by the fault, the hidden danger, the change or other reasons is also included in the closed-loop processing procedure.

In the embodiment, by inputting at least one of basic information, processing information, and associated information, after the fault alarm is triggered, continuous associated analysis can be performed on the fault alarm caused by the fault, the hidden danger, the change or other reasons so as to obtain a more accurate fault prediction result (such as a fault prediction plan).

In an embodiment, data standardization processing can be performed on the input data, an input strategy and/or an input update strategy comprising at least a standardization option or a standardization template are acquired in response to a standardized input operation of data acquisition, and a standardized input for various information of the fault, the hidden danger and the change is executed according to the input strategy and/or the input update strategy.

Application Example

An application scenario suitable for the application example is a fault processing scenario for cloud computing. Firstly, the cloud computing is introduced. Taking a cloud computing service for the big data analysis and data operation and maintenance as an example, the cloud computing service can be an addition, a use and a delivery mode of related services depending on the Internet. Cloud is a popular name of network and Internet. Cloud originally refers to the telecommunication network based on communication technology. With the development of Internet technology, it can also represent the abstraction of Internet and underlying infrastructure, such as infrastructure as a service (IaaS). IaaS is a service mode that provides IT infrastructure as a service to the outside via the network and charges according to the user's actual usage or occupation of resources. It is very important to provide stable and reliable cloud computing service environment for enterprise users. The stability of cloud computing service environment depends largely on high-quality operation and maintenance work (such as faults, hidden dangers, and changes). The work related to stability operation and maintenance in computing environment is classified into three parts: problems, hidden dangers, and changes.

The processing flow of the embodiment of the present application can be realized by three parts, i.e., data standardization (standardization of data input), automatic management (such as automatic association) and intelligent analysis (such as automatic prediction) and includes the following contents.

I. Data Standardization

In the application example, the data standardization data part is focused on standardization and normalization, and the following information which may be involved is performed with the standardized input so as to standardize the usability of data source data. The data standardization includes the following three parts:

1. Basic information, which is objective and directly available data, can be classified into the following types of data:

a) Fault: objective information generated when a fault occurs, which generally can be obtained directly from an alarm generated by a monitoring system, such as triggering time, fault content, related products, fault levels, fault categories and the like.

b) Hidden danger: such as discovery time, hidden danger, related products, influence that has occurred (such as a caused fault), and personnel involved.

c) Change: change time, change duration, change content, related scope, related product, changer, schedule, and whether there is a rollback scheme.

2. Processing information, i.e. the data generated after analysis and processing, can be classified into the following types of data:

a) Fault: information generated during processing of a fault, such as a cause of the fault, a solution, a current status, a follow-up person, and so on.

b) Hidden danger: complete influence surface, hidden danger level (see the explanation of hidden danger level above in this document), responsible person, hidden danger triggering reason, root cause, solution, and expected elimination time.

c) Change: whether to follow hierarchical release, change results, whether to rollback, and whether a fault is generated immediately 3. The associated information is related information in the upstream and downstream of the fault problem a) Fault: information related to fault processing, follow-up, eradication and the like, such as corresponding plans, possible associated hidden dangers, possible involved changes and the like.

b) Hidden danger: fault that may be caused by the hidden danger, and change that may be sourced from the hidden danger.

c) Change: hidden danger which may be introduced by the change, and fault caused by the change.

II. Automated Management

As can be seen from the data standardization, besides the basic information, i.e. faults, hidden dangers and changes, which is easy to obtain, it is more important to process information and associate information, and it is also more difficult to obtain and track information persistently. Therefore, by developing an automatic platform for automatic management and subsequent intelligent analysis, automatic management and analysis work such as centralized management, processing and analysis of data can be carried out rapidly and accurately under limited manual intervention. The automated management can include three parts:

1. Automatic information input: operation linkage of monitoring, inspection, change and the like is performed through the automatic platform, the information is input according to established standards, standardization and automation are achieved as far as possible, and labor efficiency is improved.

a) All basic information is input automatically.

b) All processing information and associated information are input automatically as much as possible, and standard options or templates are provided when manual intervention is needed, so that manpower is saved, and interference information is reduced.

2. Automatic follow-up can perform automatic collection of the information above (such as basic information, processing information and associated information), an automatic information update strategy can be further set to realize automatic information input and update, manpower is released, and automatic follow-up is realized especially for the problems which is easy to be lost and missing. The automatic follow-up can include the following parts:

a) Setting up a follow-up time limit for various problems, giving a reminder to a responsible person in an overtime period, and setting up an upgrading system.

b) Automatically checking whether the key information is complete, and forcibly inputting the key information if missing. The key information can be a reason for triggering a hidden danger, a root cause of the fault, a solution plan of fault prediction and the like. Relatively, the non-key information can be the time of fault generation and the like. Since the key information affects the accuracy of fault prediction, the missing key information can be manually input if the key information is found not to be automatically input.

c) The periodic (e.g., monthly) output follow-up overview quantifies the follow-up effect based on the problem follow-up rate (see the explanation of hidden danger level above) and the problem solving rate (see the explanation of hidden danger level above) indicators. For example, a definite follow-up person for observing a fault or a problem caused by the fault is set up; and if there are 100 problems caused by the fault, 80 problems are followed by, 10 problems are solved and 10 problems are missing and so on. This is a follow-up overview.

3. Horizontal association: the fault, the hidden danger and the change are associated with each other, so that deep root causes of mutual influences of the fault, the hidden danger, and the change are horizontally communicated, and accordingly the positioning of the root causes of the fault and the solving of the fault problem are accelerated.

a) Automatic association, if an association plan is automatically recommended and executed, the plan is a known plan, and it is found to be the fault after a fault alarm, the fault is automatically associated with the known plan corresponding to the fault so as to solve the fault; and the automatic processing can release manpower, and the faults can be further automatically associated with hidden dangers and changes.

b) Weighted association is performed on the fault, the hidden danger and the changes according to a multi-to-multi relationship, namely N:N, where N is an integer greater than 1, and the respective weights of the fault, the hidden danger and the change can be set as default values or adjusted according to the variation of processing information. If a change A introduces a hidden danger B and has a probability of 50% of causing a fault C, the relationship of weighted associations is as follows:

A→B, the weight is 1, i.e., the weight of B relative to A is 1;

A→C, the weight is 0.5, i.e., the weight of C relative to A is 0.5;

B→C, the weight is 0.5, i.e., the weight of C relative to B is 0.5.

III. Intelligent Analysis

Intelligent analysis is based on the above-mentioned data standardization and the above-mentioned automatic management, and is performed on the basis of fault alarm request data in a plurality of dimensions such as fault, hidden danger, change and the like, to produce corresponding suggestions (such as automatically generating a fault prediction plan), so as to achieve the purposes of convergence and predictability of the fault and hidden danger and controllability of the change, thereby improving the overall stability of the cloud computing environment. The intelligent analysis includes the following three aspects:

1. The whole analysis is based on data, the longer the running time of the platform, the higher the accuracy of intelligent analysis.

2. The suggestions generated by the intelligent analysis may be executed automatically, or may be executed manually according to risk control indexes.

3. The prediction results of the intelligent analysis, such as the comparison and correction of the prediction weights described above, can be compared with the actual operation data of the cloud computing service environment, and corrected thereafter, thereby continuously improving the accuracy of fault prediction.

Figure 3:
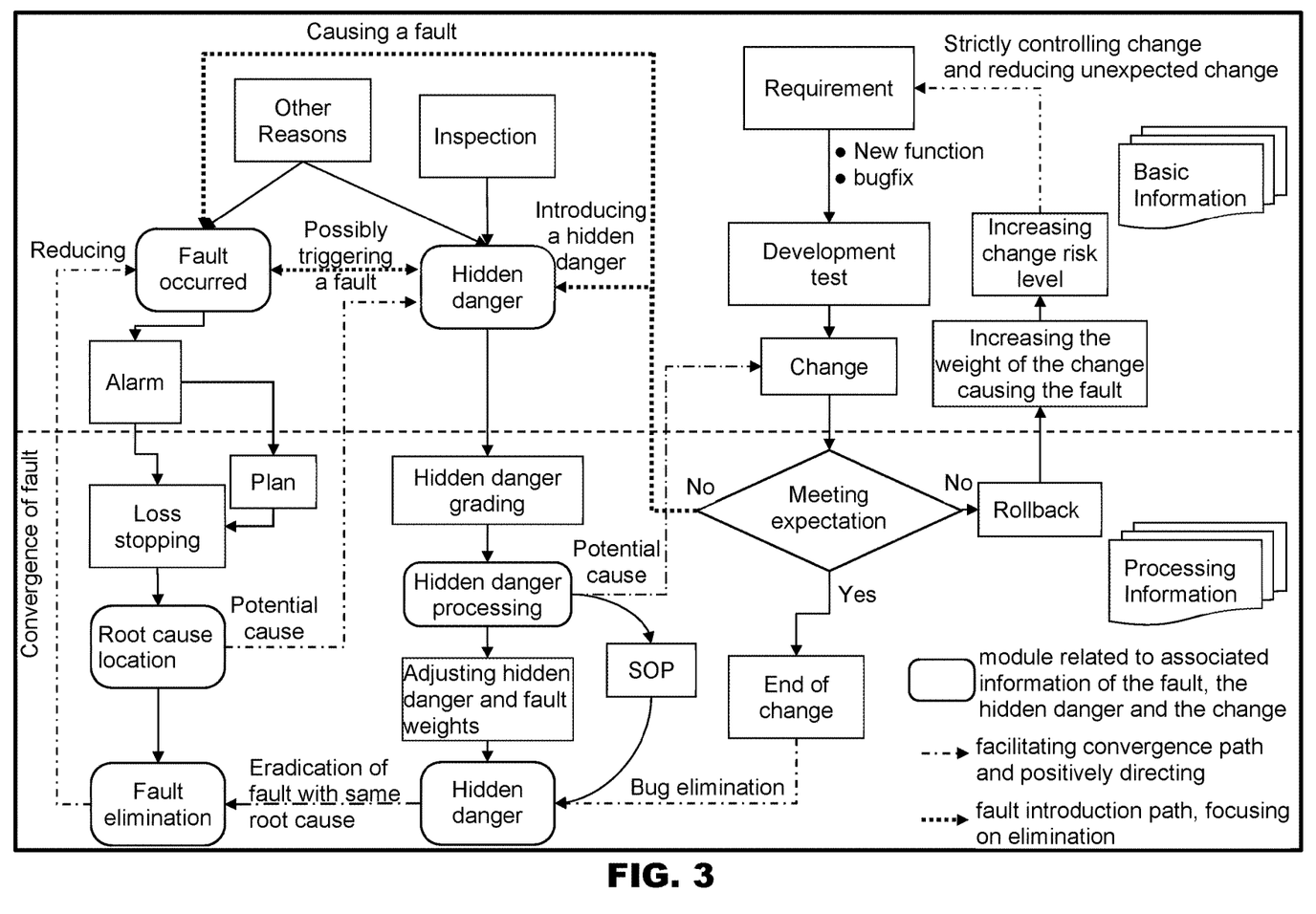
FIG. 3 is a schematic diagram of an application example of integrated linkage of the fault, the hidden danger, and the change after association according to an embodiment of the present application.

FIG. 3 is a schematic diagram of an application example of integrated linkage of the fault, the hidden danger and the change after association according to an embodiment of the present application. FIG. 3 includes the following contents:

Firstly, after a fault occurs (the fault can be found by inspection, and the fault may be due to the fault itself, or caused by a hidden danger, a change or other reasons), a fault alarm request is generated, basic information is recorded by the automation platform mentioned above, and the fault alarm request automatically triggers execution of a plan, such as associating the fault with an existing plan, so as to stop loss in time.

Secondly, root cause positioning is carried out after loss stopping in time so as to position and eliminate the fault; meanwhile, the fault is associated with hidden danger and/or change, and basic information, processing information and associated information can be input according to actual conditions in the positioning process.

Thirdly, the hidden danger is graded, and a development test is performed according to user requirements for executing the change. If the hidden danger or the change is known, the known hidden danger is processed, the corresponding SOP is called, and the known change is processed; if it does not meet the expectation, the rollback processing is executed, to achieve the purposes of eliminating the fault and ending the change, so that the risk is controlled. Meanwhile, the fault weight of the hidden danger or the change is increased respectively to indicate that the risks of the hidden danger and the change actually causing faults are increased.

Fourthly, if the diagnosis shows a new hidden danger, grading and processing of the new hidden danger can also be carried out, and whether the new hidden danger is introduced by the change or is a product defect can be analyzed based on historical data in the processing procedure.

In the process of analyzing the new hidden danger and the change, once the exception is found, the new hidden danger and the change are actively associated with the fault, and related information is input. If the new hidden danger is a product defect, the repair by the product side is promoted, and then the change is performed according to the operation levels corresponding to different changed fault weights so as to realize the repair by the product side.

Fifthly, the new hidden danger and change are associated with the fault, and product defects are repaired; the hidden danger can be eliminated, then the associated fault is eliminated, and the fault caused by the new hidden danger and change are completely eliminated; and the total number of the fault is reduced until convergence is achieved and the fault is eliminated.

In the application example, for the defects of the fault, hidden danger and change existed in the operating environment of the cloud computing service, a complete set of closed-loop processing procedures is provided; after the fault is caused by the hidden danger, the change or other reasons (such as product defects), the parameters triggering the fault and the fault are actively associated with each other, so that in response to the initiated fault alarm request, and the root causes of the fault are positioned, and are further extend to the hidden danger, the change or other reasons, so that elimination of the hidden danger is promoted, the change is safe and controllable, and the fault (including the existing fault and the newly introduced fault) is finally eliminated and eradicated. The whole flow forms a logic closed loop by means of the automatic platform, so that the cloud computing serves the operation environment of the cloud computing service, the closed-loop convergence can be achieved for the fault and the hidden danger, and the change becomes safe and controllable, so that the business performance of enterprise clients caused by the fault is prevented from being damaged, and the stability of the cloud computing service is integrally improved.

Figure 4:
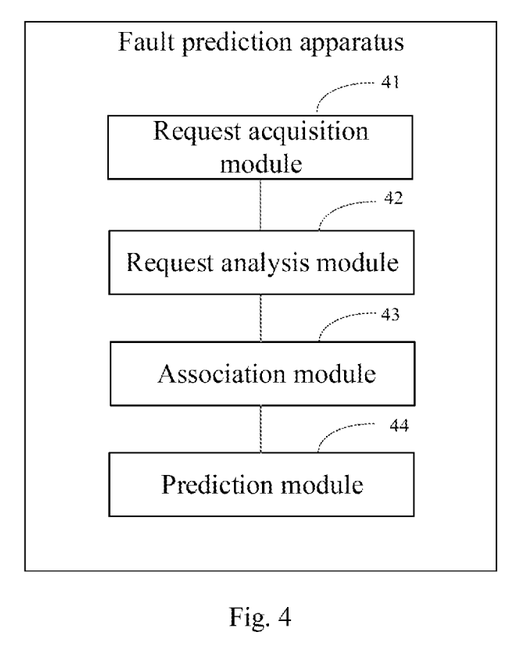
FIG. 4 is a schematic diagram showing a structure of a fault prediction apparatus according to an embodiment of the present application.

According to an embodiment of the present application, there is provided a fault prediction apparatus. FIG. 4 is a schematic diagram showing a structure of a fault prediction apparatus according to an embodiment of the present application. As shown in FIG. 4, the apparatus includes: a request acquisition module 41 configured to acquire a fault alarm request, wherein the fault alarm request is obtained by at least two fault triggering parameters of a fault generated by cloud operation, a hidden danger generated by cloud operation, and a change generated by terminal operation at a user level; a request analysis module 42 configured to analyze the fault alarm request to obtain the at least two fault triggering parameters of the fault, the hidden danger, and the change; an association module 43 configured to establish an association between the at least two fault triggering parameters of the fault, the hidden danger and the change to obtain an association result; and a prediction module 44 configured to predict a fault causing the fault alarm request according to the association result to obtain a fault prediction result.

In an embodiment, a prediction comparison module is configured to compare the fault prediction result with a historical prediction value, and correcting the fault prediction result based on the historical prediction value so as to connect the corrected prediction result to at least one required application.

In an embodiment, the association module is configured to perform a weighted correlation for respective weights of the fault, the hidden danger and the change according to a multi-to-multi relationship to obtain the association result. The respective weights use default values obtained according to design requirements or the historical prediction value.

In an embodiment, the apparatus further comprises a weight adjustment module configured to perform weight adjustment on the respective weights according to processing information and then perform the weighted association; wherein the processing information is configured to represent related information generated after analyzing and/or processing the fault, the hidden danger and the change.

In an embodiment, the association module is further configured to associate the fault with the historical prediction value; and after predicting the fault according to the historical prediction value, synchronously associate the fault with the hidden danger and the change, so as to obtain the association result.

In an embodiment, the apparatus further comprises a first operation response module configured to input at least one of basic information, processing information and associated information in response to a data acquisition operation and/or an operation of obtaining the association result. The basic information is configured to represent various self-related information of the fault, the hidden danger, and the change; the processing information is configured to represent related information generated after analyzing and/or processing the fault, the hidden danger, and the change; and the associated information is configured to represent information relating to upstream and downstream of the fault corresponding to the fault.

In an embodiment, the apparatus further comprises a second operation response module configured to acquire an input strategy and/or an input update strategy comprising at least a standardized option or a standardized template in response to a standardized input operation of data acquisition; and executing a standardized input for various information of the fault, the hidden danger, and the change according to the input strategy and/or the input update strategy; wherein the various information comprises at least one of basic information, processing information and associated information.

The functions of each module in each apparatus of the embodiment of the present application can be described by referring to the corresponding description in the above-mentioned method, and will not be described in detail herein.

According to an embodiment of the present application, the present application also provides an electronic device and a readable storage medium.

Figure 5:
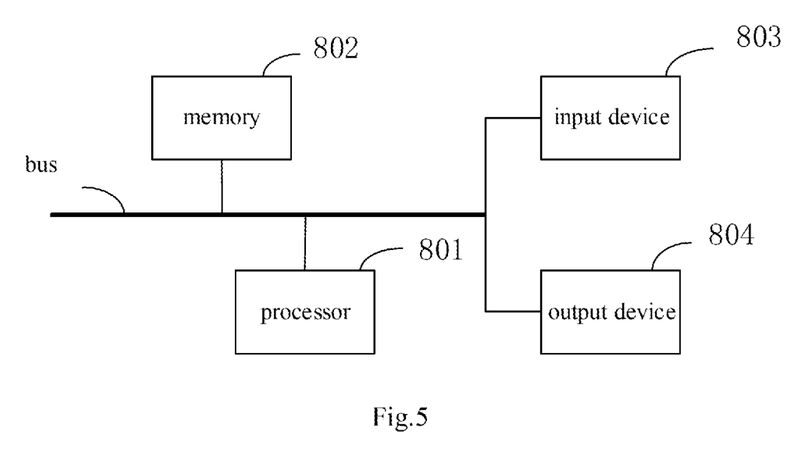
FIG. 5 is a block diagram of electronic device for implementing the fault prediction method of an embodiment of the present application.

FIG. 5 is a block diagram of electronic device for implementing the fault prediction method according to an embodiment of the present application. The electronic device may be deployment device or proxy device as described above. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital processing, cellular telephones, smart phones, wearable devices, and other similar computing devices. The components shown herein, their connections and relationships, and their functions are by way of example only and are not intended to limit the implementations of the present application described and/or claimed herein.

As shown in FIG. 5, the electronic device includes one or more processors 801, a memory 802, and interfaces for connecting components, including high-speed interfaces and low-speed interfaces. The various components are interconnected by different buses and may be mounted on a common mainboard or otherwise as desired. The processor may process instructions for execution within the electronic device, including instructions stored in or on the memory to display graphical information of a GUI on an external input/output apparatus, such as a display apparatus coupled to the interface. In other implementations, multiple processors and/or buses may be used with multiple memories, if desired. Also, multiple electronic device may be connected, each providing some of the necessary operations (e.g., as an array of servers, a set of blade servers, or a multiprocessor system). An example of a processor 801 is shown in FIG. 5.

A memory 802 is a non-transitory computer-readable storage medium provided herein. The memory stores instructions executable by at least one processor to cause the at least one processor to perform the fault prediction method provided herein. The non-transitory computer-readable storage medium of the present application stores computer instructions for enabling the computer to perform the fault prediction method provided herein.

The memory 802, as a non-transitory computer-readable storage medium, may be used to store non-transitory software programs, non-transitory computer-executable programs, and modules, such as program instructions/modules corresponding to the fault prediction method in embodiments of the present application (e.g., a request acquisition module, a request analysis module, an association module, a prediction module and other modules shown in FIG. 4). The processor 801 executes various functional applications of the server and data processing by running non-transient software programs, instructions, and modules stored in the memory 802, i.e., implementing the fault prediction method in the method embodiment described above.

The memory 802 may include a storage program area and a storage data area, wherein the storage program area may store an operating system, and an application program required for at least one function; and the storage data area may store data created according to the use of the electronic device, etc. In addition, the memory 802 may include a high speed random access memory, and may also include a non-transitory memory, such as at least one disk storage apparatus, a flash memory apparatus, or other non-transitory solid state storage devices. In some embodiments, the memory 802 optionally includes a memory remotely located with respect to the processor 801, which may be connected via a network to the electronic device. Examples of such networks include, but are not limited to, the Internet, intranets, local area networks, mobile communication networks, and combinations thereof.

The electronic device for the fault prediction method may further include an input apparatus 803 and an output apparatus 804. The processor 801, the memory 802, the input apparatus 803, and the output apparatus 804 may be connected by a bus or other means, exemplified by a bus connection in FIG. 5.

The input apparatus 803 may receive input digital or character information and generate key signal inputs related to user settings and functional controls of electronic device, such as a touch screen, a keypad, a mouse, a track pad, a touch pad, a pointer stick, one or more mouse buttons, a track ball, a joystick, and other input devices. The output apparatus 804 may include a display apparatus, an auxiliary lighting apparatus (e.g., an LED), a tactile feedback apparatus (e.g., a vibrating motor), etc. The display apparatus may include, but is not limited to, a liquid crystal display (LCD), an Light Emitting Diode (LED) display, and a plasma display. In some embodiments, the display apparatus may be a touch screen.

Various implementations of the systems and techniques described herein may be implemented in a digital electronic circuit system, an integrated circuit system, an Application Specific Integrated Circuit (ASIC), a computer hardware, a firmware, a software, and/or a combination thereof. These various embodiments may include an implementation in one or more computer programs, which can be executed and/or interpreted on a programmable system including at least one programmable processor; the programmable processor can be a dedicated or general-purpose programmable processor, which can receive data and instructions from, and transmit data and instructions to, a memory system, at least one input apparatus, and at least one output apparatus.

These computing programs (also referred to as programs, software, software applications, or code) include machine instructions of a programmable processor, and may be implemented using high-level procedural and/or object-oriented programming languages, and/or assembly/machine languages. As used herein, the terms "machine-readable medium" and "computer-readable medium" refer to any computer program product, device, and/or apparatus (e.g., a magnetic disk, an optical disk, a memory, a programmable logic apparatus (PLD)) for providing machine instructions and/or data to a programmable processor, including a machine-readable medium that receives machine instructions as machine-readable signals. The term "machine-readable signal" refers to any signal used to provide machine instructions and/or data to a programmable processor.

To provide an interaction with a user, the systems and techniques described herein may be implemented on a computer having a display apparatus (for example, a cathode ray tube (CRT) or an liquid crystal display (LCD) monitor) for displaying information to the user; and a keyboard and a pointing apparatus (e.g., a mouse or a trackball) through which a user can provide input to the computer. Other types of devices may also be used to provide an interaction with a user. For example, the feedback provided to the user may be any form of sensory feedback (e.g., visual feedback, auditory feedback, or tactile feedback); and the inputs from the user may be received in any form, including acoustic input, voice input, or tactile input.

The systems and techniques described herein may be implemented in a computing system (e.g., as a data server) that includes a background component, or a computing system (e.g., an application server) that includes a middleware component, or a computing system (e.g., a user computer having a graphical user interface or a web browser through which a user may interact with embodiments of the systems and techniques described herein) that includes a front-end component, or a computing system that includes any combination of such background components, middleware components, or front-end components. The components of the system may be interconnected by any form or medium of digital data communication (e.g., a communication network). Examples of communication networks include Local Area Network (LAN), Wide Area Network (WAN), and Internet.

The computer system may include a client and a server. The client and the server are typically remote from each other and typically interact via the communication network. The relationship of the client and the server is generated by computer programs running on respective computers and having a client-server relationship with each other.

With the present application, a fault alarm request may be acquired, the fault alarm request is obtained by at least two fault triggering parameters of a fault generated by cloud operation, a hidden danger generated by cloud operation and a change generated by terminal operation at a user level; the fault alarm request is analyzed to obtain the at least two fault triggering parameters of the fault, the hidden danger and the change; an association between the at least two fault triggering parameters of the fault, the hidden danger and the change is established to obtain an association result; and a fault causing the fault alarm request is predicted according to the association result to obtain a fault prediction result. Due to the fact that the association is established based on the fault itself triggering the fault alarm request and at least two fault triggering parameters related to the fault, such as the hidden danger and the change, and the fault causing the fault alarm request is predicted according to the association result obtained by establishing the association, the fault prediction accuracy can be improved.

It will be appreciated that the various forms of flow shown above may be used, but with reordered, added or removed steps. For example, the steps recited in the present application may be performed in parallel or sequentially or may be performed in a different order, so long as the desired results of the technical solutions disclosed in the present application can be achieved, and no limitation is made herein.

The above-described embodiments are not to be construed as limiting the scope of the present application. It will be apparent to those skilled in the art that various modifications, combinations, sub-combinations and substitutions are possible, depending on design requirements and other factors. Any modifications, equivalents, and improvements within the spirit and principles of this application are intended to be included within the scope of this application.

For purposes of interpreting the claims, it is expressly intended that the provisions of Section 112, sixth paragraph of 35 U.S.C. are not to be invoked unless the specific terms "means for" or "step for" are recited in a claim.

What is claimed is:

1. A fault prediction method, comprising:
    acquiring a fault alarm request, wherein the fault alarm request is obtained by at least two fault triggering parameters of a fault generated by cloud operation, a hidden danger generated by cloud operation, and a change generated by terminal operation at a user level;
    analyzing the fault alarm request, to obtain at least two fault triggering parameters of the fault, the hidden danger, and the change;
    establishing an association between the at least two fault triggering parameters of the fault, the hidden danger, and the change, to obtain an association result; and
    predicting a fault causing the fault alarm request according to the association result, to obtain a fault prediction result;
    wherein the method further comprises:
    inputting at least one of basic information, processing information, and associated information, in response to at least one of a data acquisition operation and an operation of obtaining the association result;
    wherein the basic information is configured to represent various self-related information of the fault, the hidden danger, and the change;
    the processing information is configured to represent related information generated after performing at least one of analyzing and processing of the fault, the hidden danger, and the change; and
    the associated information is configured to represent information relating to upstream and downstream of the fault corresponding to the fault.

2. The method according to claim 1, further comprising:
    comparing the fault prediction result with a historical prediction value, and
    correcting the fault prediction result with reference to the historical prediction value, to connect the corrected prediction result to at least one required application.

3. The method according to claim 1, wherein the establishing the association between at least two fault triggering parameters of the fault, the hidden danger, and the change, to obtain the association result, comprises:
    performing a weighted association for respective weights of the fault, the hidden danger, and the change according to a multi-to-multi relationship, to obtain the association result; and
    wherein the respective weights take default values obtained according to design requirements or the historical prediction value.

4. The method according to claim 3, further comprising:
    the weighted association is performed after performing weight adjustment on the respective weights according to processing information; and
    wherein the processing information is configured to represent related information generated after performing at least one of analyzing and processing of the fault, the hidden danger, and the change.

5. The method according to claim 2, wherein the establishing the association between the at least two fault triggering parameters of the fault, the hidden danger, and the change, to obtain the association result, comprises:
    associating the fault with the historical prediction value; and after predicting the fault according to the historical prediction value, synchronously associating the fault with the hidden danger and the change, to obtain the association result.

6. The method according to claim 1, further comprising:
acquiring at least one of an input strategy and an input update strategy comprising at least a standardized option or a standardized template, in response to a standardized input operation of data acquisition; and
executing a standardized input for various information of the fault, the hidden danger, and the change according to the at least one of the input strategy and the input update strategy; and
wherein the various information comprises at least one of basic information, processing information, and associated information.

7. A fault prediction apparatus, comprising:
a processor and a memory for storing one or more computer programs executable by the processor,
wherein when executing at least one of the computer programs, the processor is configured to:
acquire a fault alarm request, wherein the fault alarm request is obtained by at least two fault triggering parameters of a fault generated by cloud operation, a hidden danger generated by cloud operation, and a change generated by terminal operation at a user level;
analyze the fault alarm request to obtain the at least two fault triggering parameters of the fault, the hidden danger, and the change;
establish an association between the at least two fault triggering parameters of the fault, the hidden danger, and the change, to obtain an association result; and
predict a fault causing the fault alarm request according to the association result, to obtain a fault prediction result;
wherein, when executing at least one of the computer programs, the processor is further configured to:
acquire at least one of an input strategy and an input update strategy comprising at least a standardized option or a standardized template, in response to a standardized input operation of data acquisition; and
execute a standardized input for various information of the fault, the hidden danger, and the change, according to the at least one of the input strategy and the input update strategy;
wherein the various information comprises at least one of basic information, processing information, and associated information.

8. The apparatus according to claim 7, wherein, when executing at least one of the computer programs, the processor is further configured to:
compare the fault prediction result with a historical prediction value, and
correct the fault prediction result with reference to the historical prediction value, to connect the corrected prediction result to at least one required application.

9. The apparatus according to claim 7, wherein, when executing at least one of the computer programs, the processor is further configured to:
perform a weighted association for respective weights of the fault, the hidden danger, and the change according to a multi-to-multi relationship, to obtain the association result; and
wherein the respective weights take default values obtained according to design requirements or the historical prediction value.

10. The apparatus according to claim 9, wherein, when executing at least one of the computer programs, the processor is further configured to:
perform weight adjustment on the respective weights according to processing information, and then perform the weighted association; and
wherein the processing information is configured to represent related information generated after performing at least one of analyzing and processing of the fault, the hidden danger, and the change.

11. The apparatus according to claim 8, wherein, when executing at least one of the computer programs, the processor is further configured to:
associate the fault to the historical prediction value; and
after predicting the fault according to the historical prediction value, synchronously associate the fault with the hidden danger and the change, to obtain the association result.

12. The apparatus according to claim 7, wherein, when executing at least one of the computer programs, the processor is further configured to:
input at least one of basic information, processing information, and associated information, in response to at least one of a data acquisition operation and an operation of obtaining the association result;
wherein the basic information is configured to represent various self-related information of the fault, the hidden danger, and the change;
the processing information is configured to represent related information generated after performing at least one of analyzing and processing of the fault, the hidden danger, and the change; and
the associated information is configured to represent information relating to upstream and downstream of the fault corresponding to the fault.

13. A non-transitory computer-readable storage medium storing computer instructions, wherein the computer instructions are configured to enable the computer to:
acquire a fault alarm request, wherein the fault alarm request is obtained by at least two fault triggering parameters of a fault generated by cloud operation, a hidden danger generated by cloud operation, and a change generated by terminal operation at a user level;
analyze the fault alarm request to obtain the at least two fault triggering parameters of the fault, the hidden danger, and the change;
establish an association between the at least two fault triggering parameters of the fault, the hidden danger, and the change, to obtain an association result; and
predict a fault causing the fault alarm request according to the association result, to obtain a fault prediction result;
wherein the computer instructions are further configured to enable the computer to: input at least one of basic information, processing information, and associated information, in response to at least one of a data acquisition operation and an operation of obtaining the association result;
wherein the basic information is configured to represent various self-related information of the fault, the hidden danger, and the change;
the processing information is configured to represent related information generated after performing at least one of analyzing and processing of the fault, the hidden danger, and the change; and
the associated information is configured to represent information relating to upstream and downstream of the fault corresponding to the fault.

14. The non-transitory computer-readable storage medium according to claim 13, wherein the computer instructions are further configured to enable the computer to:
compare the fault prediction result with a historical prediction value, and
correct the fault prediction result with reference to the historical prediction value, to connect the corrected prediction result to at least one required application.

15. The non-transitory computer-readable storage medium according to claim 13, wherein the computer instructions are further configured to enable the computer to:
perform a weighted association for respective weights of the fault, the hidden danger, and the change according to a multi-to-multi relationship, to obtain the association result; and
wherein the respective weights take default values obtained according to design requirements or the historical prediction value.

16. The non-transitory computer-readable storage medium according to claim 15, wherein the computer instructions are further configured to enable the computer to:
perform the weighted association after performing weight adjustment on the respective weights according to processing information; and
wherein the processing information is configured to represent related information generated after performing at least one of analyzing and processing of the fault, the hidden danger, and the change.

17. The non-transitory computer-readable storage medium according to claim 14, wherein the computer instructions are further configured to enable the computer to:
associate the fault with the historical prediction value; and
synchronously associate the fault with the hidden danger and the change to obtain the association result, after predicting the fault according to the historical prediction value.

18. The non-transitory computer-readable storage medium according to claim 13, wherein the computer instructions are further configured to enable the computer to:
acquire at least one of an input strategy and an input update strategy comprising at least a standardized option or a standardized template, in response to a standardized input operation of data acquisition; and
execute a standardized input for various information of the fault, the hidden danger, and the change, according to the at least one of the input strategy and the input update strategy;
wherein the various information comprises at least one of basic information, processing information, and associated information.

* * * * *